(No Model.)
D. WELLINGTON.
WATER CLOSET, &c.
No. 407,558. Patented July 23, 1889.
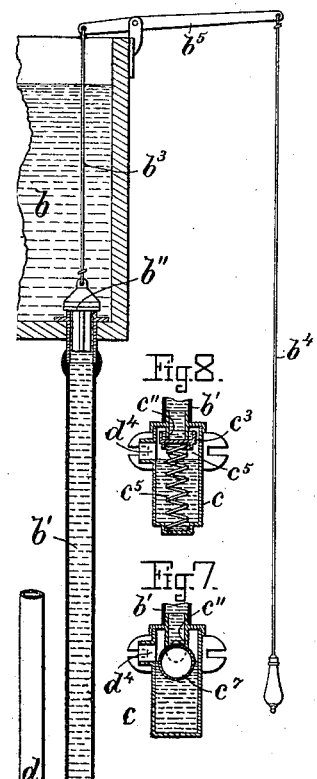
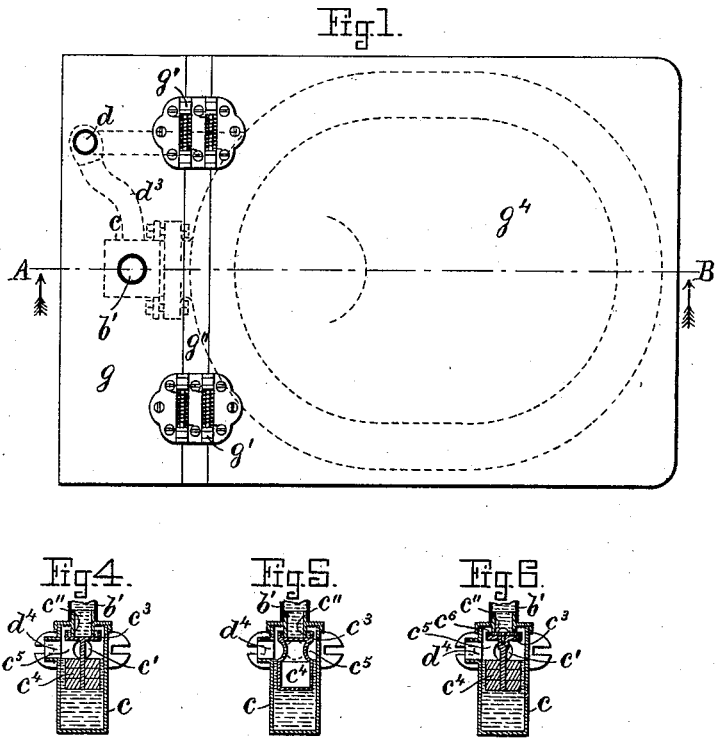
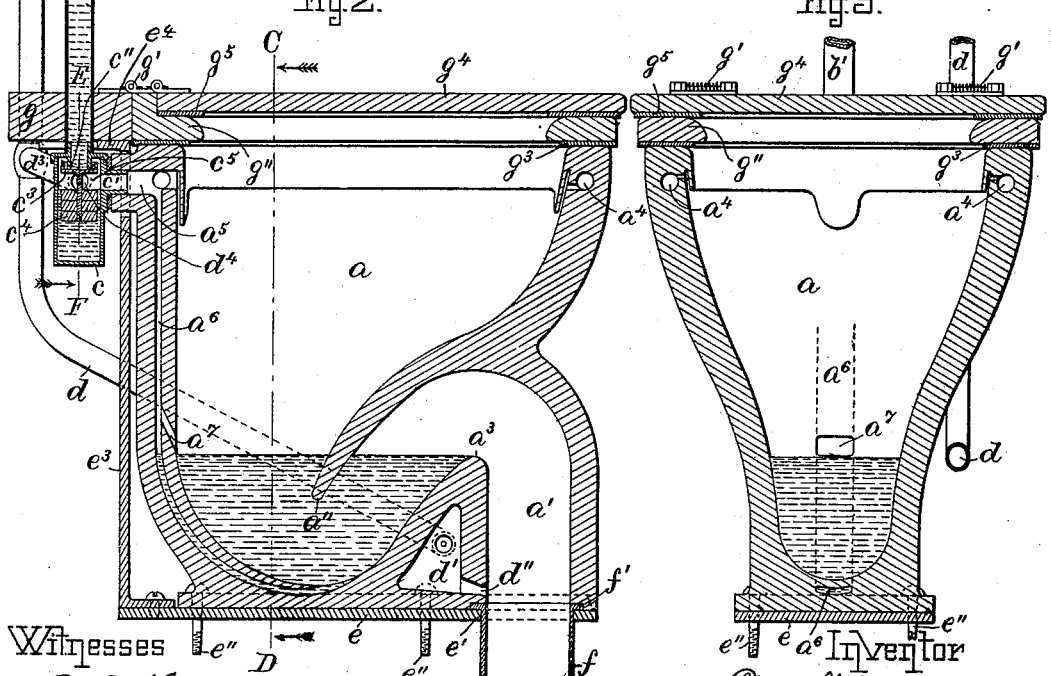
Witnesses
D. E. Kempster
C. J. Willey
Inventor
Darius Wellington
by Henry Chadbourn
his atty.

UNITED STATES PATENT OFFICE.

DARIUS WELLINGTON, OF BOSTON, MASSACHUSETTS.

WATER-CLOSET, &c.

SPECIFICATION forming part of Letters Patent No. 407,558, dated July 23, 1889.

Application filed February 27, 1889. Serial No. 301,303. (No model.)

*To all whom it may concern:*

Be it known that I, DARIUS WELLINGTON, a citizen of the United States, and a resident of Boston, in the county of Suffolk and State of Massachusetts, have invented certain new and useful Improvements in Water-Closets and Similar Receptacles, of which the following, taken in connection with the accompanying drawings, is a specification.

This invention relates to water-closets and similar apparatus having a valved service-pipe leading from an elevated water-tank to the flushing-rim of the basin; and the objects of my invention are to provide novel means for obtaining a noiseless flush of water, to provide novel means for ventilating the closet, and to otherwise improve this type of apparatus, as will hereinafter appear.

The objects of my invention I accomplish in the manner and by the combination of devices hereinafter described and claimed, reference being made to the accompanying drawings, in which—

Figure 1 represents a plan view of my invention. Fig. 2 represents a central longitudinal section of my improved water-closet on the line A B, shown in Fig. 1, and also showing its connection to a supply-tank. Fig. 3 represents a cross-section of the closet on the line C D, shown in Fig. 2. Fig. 4 represents a detail vertical section on the line E F, shown in Fig. 2 of the valve in the supply or service pipe; and Figs. 5, 6, 7, and 8 represent modifications of the same.

Similar letters refer to similar parts wherever they occur on the different parts of the drawings.

$a$ represents the basin of the water-closet having the trapped discharge or outlet pipe $a'$, the dip $a''$ of which is below the level of the lowest part $a^3$ of the discharge-mouth of said trap. The basin $a$ is provided with a flushing-rim $a^4$ of any desired construction.

$a^5$ represents the inlet-opening for the flushing-water to said basin, and $a^6$ represents the rear force-pipe, which enters the basin at a point below the level of the water in the trap of the basin, and preferably at the lowest point of said trap.

$b$ represents a supply-tank, and $b'$ represents the supply or service pipe leading from such tank to the inlet-opening of the basin of the water-closet.

$b''$ represents a valve in the supply-tank for closing the supply-pipe $b'$, and said valve is operated by the cords or chains $b^3$ $b^4$ and lever $b^5$, or in any other convenient and well-known manner.

$c$ represents a valve-casing interposed between the supply-pipe $b'$ and the inlet-opening $a^5$, and attached water-tight to said inlet-opening in any suitable manner, said casing having the opening $c'$ coincident with the opening $a^5$.

$c''$ represents a valve-seat in the upper part of the valve-casing $c$, which preferably projects a little downward into the valve-casing, and $c^3$ represents a valve adapted to be seated on said valve-seat, either by means of a suitable float $c^4$, as shown in Figs. 2, 4, 5, 6, and 7, or by means of a spring $c^5$, as shown in Fig. 8.

The valve-casing $c$ extends below the opening $c'$, and forms a chamber for containing sufficient water to raise the float, and with it the valve against its seat.

I prefer to make the valve cup-shaped, as shown in Figs. 2, 4, 5, and 8, so as to contain a small quantity of water, and thereby to form a liquid seal to the mouth of the supply-pipe $b'$ when the valve $c^3$ is held against its seat, as described, and also to obviate the necessity of a packing, and to insure a joint between the valve and its seat, which will not allow air to enter the service or supply pipe when the valve is on its seat; but the valve may be made flat and supplied with a suitable packing $c^6$, as shown in Fig. 6, or in the form of a ball $c^7$, as shown in Fig. 7, without departing from the spirit of my invention. When the valve $b''$ is raised, water flows through the supply-pipe $b'$, and as the weight of the column of water in said pipe and supply-tank $b$ is heavier than the buoyancy of the float $c^4$, the valve $c^3$ will be forced away from its seat and allow the water to pass through openings $c'$ and $a^5$ to flush the basin, a portion of such water passing through the rear force-pipe $a^6$ to help force the contents of the basin through the discharge-opening $a'$. When the valve $b''$ is seated on the supply-pipe $b'$ and closes the same, the buoyancy of the float $c^4$ will force the cup-shaped valve immediately against its seat and prevent the water in the pipe $b'$ from being discharged on account of the pressure of the air on the liquid in the cup-shaped valve being heavier than the column of water in the pipe $b'$.

$d$ represents a ventilating-pipe leading to the open air at any suitable place, said pipe being connected to a hollow chamber $d'$, in the lower portion of the basin $a$, and $d''$ represents an opening from said chamber $d'$ into the discharge or soil pipe below the trap of the closet, and it will be seen that any odor in the soil-pipe will pass through the opening $d''$, chamber $d'$, and ventilating-pipe $d$ to the open air.

On account of the pipe $d$ having free communication with the soil-pipe and the open air, any suction in the soil-pipe tending to syphon off the water in the seal of the closet will be relieved by air being drawn through pipe $d$, chamber $d'$, and opening $d''$.

$d^3$ in Fig. 2 represents a branch from the ventilating-pipe $d$, which enters the valve-casing $c$ through the opening $d^4$ in said valve-casing above the normal level of the liquid in the valve-casing, and as an annular space $c^5$ is left between the cup-shaped valve $c^3$ and its float $c^4$, free communication is established between the upper portion of the basin $a$ through the flushing-rim $a^4$, openings $a^5$ $c'$, valve-casing $c$, pipe $d^3$, and ventilating-pipe $d$ to the open air, thus ventilating the upper part of the basin.

$a^7$ represents an opening through the wall of the basin $a$, a little above the level of the water in the seal of the closet and communicating with the rear force-pipe $a^6$, and through said force-pipe, openings $a^5$ $c'$, valve-casing $c$, branch pipe $d^3$, and pipe $d$ with the open air, thus furnishing ventilation for the lower part of the basin $a$ just above its seal. $e$ represents the base-plate on which the water-closet is adapted to stand, and it is provided with a perforation $e'$ coincident with the discharge-opening in the closet. Said base-plate is preferably made of metal, and is secured to the floor by screws or other fastening devices, and the water-closet is fastened to the floor on said base-plate by means of the screws $e''$ $e''$, which may also serve to fasten the base-plate to the floor, as shown in the drawings.

$f$ represents a sleeve made of rubber or other suitable material, and provided with a flange $f'$ in its upper end, fitting into a correspondingly-formed recess in the lower part of the water-closet and clamped between the water-closet and base-plate $c$, as shown in Fig. 2, said sleeve $f$ being adapted to enter the soil-pipe and to make a tight joint between it and the water-closet.

To the base-plate $e$ is secured a bracket $e^3$, as shown in Fig. 2, and to the lateral horizontal flange 4, formed at the top of said bracket, is secured the back board $g$ of the seat of the water-closet, and to said back board is hinged, by means of one portion of the spring-hinges $g'$ $g'$, the seat $g''$ of the closet, said seat being provided with a cushion $g^3$, made of rubber or of other suitable material, which rests against the upper rim of the closet and forms an air-tight joint between said closet and seat, preventing any escape of odor from said closet at this place.

$g^4$ represents the cover of the closet, hinged to the seat by means of the other portion of the spring-hinges $g'$ $g'$, and said cover is provided with the cushion $g^5$, made of rubber or other suitable material, which makes an air-tight joint between the seat and the cover, preventing all escapement of odor between the cover and seat; and it will be seen that all odor in the closet must pass up through the flushing-rim $a^4$, or through the opening $a^7$, and out into the open air through the ventilating-pipe $d$.

By securing the seat and cover to the base-plate by means of the bracket $e^3$ all strain in lifting the seat or cover to the closet is resisted by the base-plate, and not by the closet, thereby preventing the liability of straining the joints in the closets, causing them to leak.

The base-plate $e$ is not an essential feature in this invention as the bracket $e^3$ and the water-closet may be screwed to the floor without such base-plate and the flanged sleeve $f$ held between the lower part of the closet and the upper end of the soil-pipe.

Having thus fully described the nature, construction, and operation of my invention, I wish to secure by Letters Patent, and claim—

1. The combination, with a water-closet basin or similar receptacle having a water-inlet opening, a water-supply tank, a service-pipe for connecting the tank with the inlet-opening, and a supply-controlling valve at the upper portion of the service-pipe, of a valve-casing inteposed between and communicating with the lower end of the service-pipe and the inlet-opening of the basin, and a self-closing valve located in said valve-casing between the lower end of the service-pipe and the basin, and automatically opened by the water-pressure when the supply-controlling valve is opened to obtain a noiseless flush at all times, substantially as described.

2. A water-closet basin or similar receptacle having opening $a^5$ to admit water to flush the basin, the tank $b$, supply-pipe $b'$, valve $b''$ to close the supply-pipe at the tank, valve-casing $c$, having valve-seat $c''$, and opening $c'$, communicating with opening $a^5$ in the basin, valve $c^3$, and float $c^4$ to automatically open and close supply-pipe $b'$ at or near the water-closet basin, all combined to be operated as described, for the purpose set forth.

3. In a water-closet or similar receptacle, a basin provided with a flushing-rim and opening to admit water to flush the basin, a valve-casing communicating with the flushing-opening, a supply-pipe entering the valve-casing, a valve to close the supply-pipe, and an air-space in the upper part of the valve-casing and communicating with the basin through the flushing-opening, combined with a ventilating-pipe leading from the upper part of the valve-casing, for the purpose set forth and described.

4. In a trapped water-closet or similar receptacle provided with an opening to admit water to flush the closet, a valve-casing communicating with the flushing-opening, a supply-pipe entering the valve-casing, a valve to close the supply-pipe, an air-space in the upper part of the valve-casing and communicating with the flushing-opening, and a ventilating-pipe leading from the upper part of the valve-casing, combined with a passage-way in the wall of the water-closet, and an opening through the wall connecting the passage-way with the basin of the closet at or a little above the level of the water in the seal of the closet, to operate as and for the purpose set forth.

In testimony whereof I have signed my name to this specification, in the presence of two subscribing witnesses, on this 23d day of February, A. D. 1889.

DARIUS WELLINGTON.

Witnesses:
   HENRY CHADBOURN,
   M. B. MCMANUS.